United States Patent [19]

Bestehorn

[11] 3,952,417
[45] Apr. 27, 1976

[54] ANGLE MEASURING DEVICE
[75] Inventor: Peter Bestehorn, Jakobneuharting, Germany
[73] Assignee: Messerschmitt-Bölkow-Blohm GmbH, Munich, Germany
[22] Filed: Sept. 12, 1974
[21] Appl. No.: 505,358

[30] Foreign Application Priority Data
Sept. 19, 1973 Germany.......................... 2347054

[52] U.S. Cl.................................. 33/75 R; 33/1 N; 33/79 B
[51] Int. Cl.². ......................................... G01B 5/24
[58] Field of Search .................. 33/1 N, 1 PT, 75 R, 33/90, 180 R, 151, 79 AB, 25 R, 174 C, 174 P

[56] References Cited
UNITED STATES PATENTS

| 570,767 | 11/1896 | Pennington | 33/75 R |
|---|---|---|---|
| 1,778,405 | 10/1930 | Sullenberger | 33/75 R |
| 2,136,140 | 11/1938 | Langsner | 33/79 A |
| 2,645,858 | 7/1953 | Davis | 33/180 R |
| 2,884,698 | 5/1959 | Wursch | 33/75 R |
| 3,041,599 | 6/1962 | Beaudette | 33/1 PT |
| 3,270,426 | 9/1966 | Fisher et al. | 33/180 R |
| 3,815,247 | 6/1974 | Debrunner | 33/75 R |

FOREIGN PATENTS OR APPLICATIONS
190,420  6/1957  Austria ............................. 33/79 A OTHER PUBLICATIONS
German Gebrauchsmuster No. 7,237,456, pub. June 28, 1973.

Primary Examiner—Richard E. Aegerter
Assistant Examiner—John W. Shepperd
Attorney, Agent, or Firm—Woodhams, Blanchard and Flynn

[57]  ABSTRACT

Device for measuring an angle defined by two adjacent planes. The invention defines a pair of independent parallelogram units each hinged at their respective corners and each carrying an angle sensing unit at a first respective end thereof. The second respective ends of said parallelogram units are connected to an indicating device for responding to the relative position of said parallelogram units. One of the parallelogram units is secured to an angle sensing unit and an indicating device through spherical pivot bearings. Thus, the angle between said sensing units is reflected in and indicated by said indicator regardless of translational position changes between the two planes in the orthogonally related z and x directions.

5 Claims, 5 Drawing Figures 3,952,417

ANGLE MEASURING DEVICE

FIELD OF THE INVENTION

The invention relates to a device for measuring angles and angular variations, which are formed by two surfaces, as for example by the flaps on aircraft.

BACKGROUND OF THE INVENTION

Devices for the measuring of angles are already widely known. Thus, for example, an adjustable tri-square is known, one leg of which tri-square has a number of successively positioned notches which correspond to the various angular positions. One of the legs is movably hinged and can be adjusted and clamped in a selected angular position. Adjacent surfaces which converge at a common angle are mounted for the individual notches, between which countersurfaces the other leg is pressed with a wedge-shaped part after each respective transverse movement and in this manner the desired angular relationship is determined. This device, however, requires a direct access to the axis of rotation of the surfaces which are movable with respect to one another and even then does not result in the desired angular precision necessary in modern aircraft construction.

The basic purpose of the invention is to produce an angle measuring device, in which the measurement is unaffected by translatory movements of the planes which are to be measured and which does not require access to the axis of rotation.

This purpose is attained by hingedly associating two parallelogram-forming rails with a scale disk bearing a vernier wherein the parallelograms are connected to lockable feet through suitable pivot bearings and universal pivot bearings so that translatory position changes of the planes in directions $z$ and $x$ have no effect on the measurement. These measures prevent translational changes in position of the individual planes with respect to one another from affecting the result of the measurement. Measurements of angles are also possible when the plane in which the measurement is taken does not lie perpendicular with respect to the break-line and when in general the surfaces to be measured do not lie in a single plane.

A further development of the invention provides that an electric pick-up is associated with the scale disk for the electric indication and registration of the measurement. These measures improve the reading reliability and exactness.

Furthermore it is provided that the vernier is constructed adjustably and lockably for the zero-point adjustment and has for this purpose a regulator wheel and a clamping screw. This permits a close adjustment and precision in the resulting measurement.

Furthermore it is provided that a bar for preadjusting the device in one direction is associated with the parallelogram. This permits a widening of the measuring range in the oppposite direction.

One embodiment provides that the feet are provided with holding and clamping devices and are adjustable selectively through an angle of 90°. This provides an easier adjustment of the device to various measuring problems.

The invention is hereinafter described and illustrated in connection with an exemplary embodiment.

DETAILED DESCRIPTION

Figure 2:
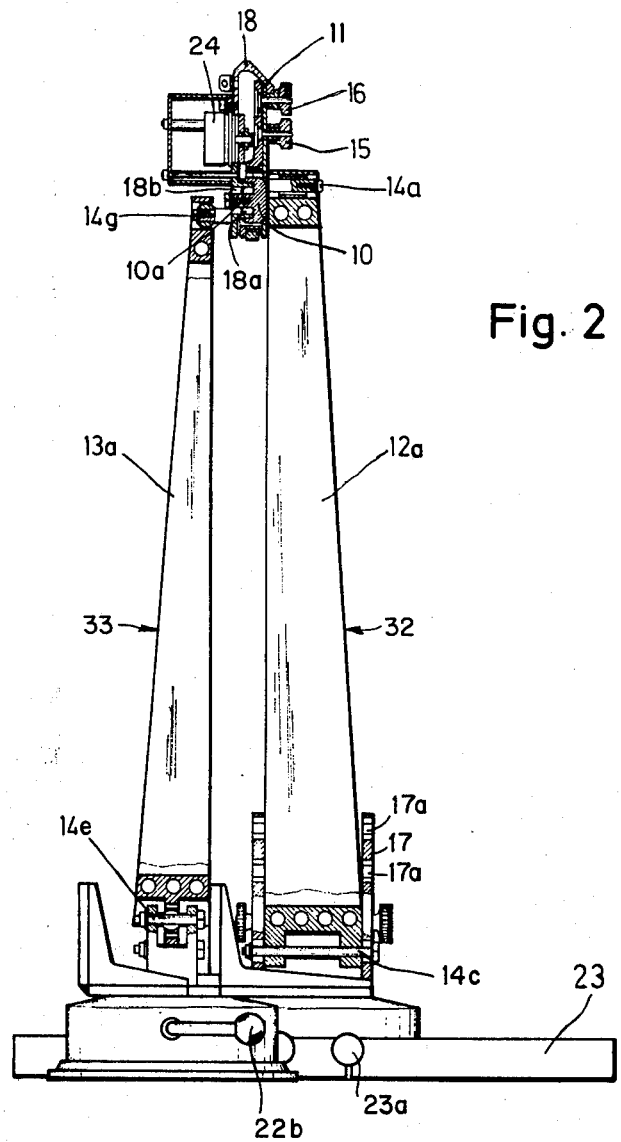
FIG. 2 is a side view of the measuring device according to FIG. 1.
Figure 5:
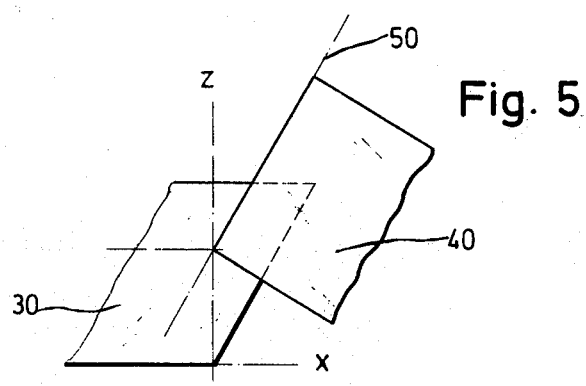
FIG. 5 illustrates two surfaces, during the measurement of which one of the planes is subjected to translatory position changes in the directions $x$ and $z$.

A semicircular disk 10 is connected to a pair of rails 12 and 12a through the upper of a pair of single axis pivot bearings 14a, 14b and is provided with a vernier 11 having indicia 11a thereon which is arranged for zero-point adjustment, adjustably and lockably by means of an adjusting wheel 15 and a clamping screw 16. A scale carrier 18 having angle indicating indicia 18c thereon is connected through the upper of a pair of spherical pivot bearings 14g (only one of which is shown in FIG. 2) to two rails 13 and 13a. The scale carrier 18 is connected to the semicircular disk 10 by a shank part 10a on the disk 10 being received in a bore 18a in the carrier 18. Either one or a pair, a pair being shown in FIG. 2, of bearing sleeves 18b are pressed into the bore 18a. A screw and washer secure the carrier 18 to the disk 10. The rail pairs 13,13a are connected to the foot member 20 through the lower of a pair of spherical pivot bearings 14e,14f, respectively. The rail pairs 13,13a are connected to the foot member 21 through the lower of a pair of single axis pivot bearings 14c,14d. the feet 20,21 carry special holding and suction devices 22, which permit the measuring device to be suctionally secured nonmovably on the surfaces 30, 40 to be measured, said surfaces 20, 40, for example, being the wing surfaces and th landing flaps of an aircraft, which pivot about the axis of rotation 50. The device 22 is comprised of a rubber membrane 21a havng a plate member 21b embedded therein. The plate member 21b is secured to a lever 22b through a conventional force translation system 22a. The plate member 21b is pulled upwardly away from the surface 30 or 40 to effect a suction gripping of the holding device 22 to the surface 30 or 40. A pushing of the membrane 21b toward the surface will permit air to enter the space between the membrane and the surface to release the gripping action between the holding device 22 and the surface 30 or 40. Two parallelograms linkages 32 and 33 are created by this construction, namely the first parallelogram linkage 32 comprising the elements 10, 14a, 14b, 14c, 14d, 12, 12a and 21 and the second parallelogram linkage 33 comprising the elements 18, 14e, 14f, 14g 13, 13a and 20.

Figures 3, 4:
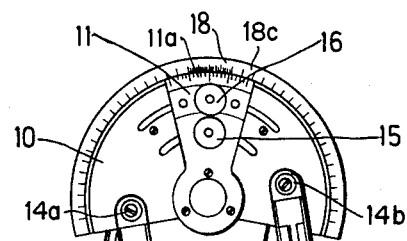
FIG. 3 is an illustration of two surfaces defining therebetween the angle to be measured.
FIG. 4 illustrates two surfaces with respect to which the plane in which measurement is taken is not perpendicular to the axis of rotation or the pivot axis.

The pivot bearings 14a, 14b, 14c, 14d and the universal pivot bearings 14e, 14f, 14g for the suspension of the parallelogram linkages 32 and 33 makes it possible to measure in the direction of aerodynamic air flow those angles or angular variations which are formed by the surfaces 30, 40 (FIG. 4) wherein the plane of such measurement does not lie perpendicularly with respect to the break-line. Translational position-changes of one of the planes 30 or 40 in the orthogonally related $x$ and z directions will not affect the accuracy of the measurement inasmuch as such movement does not affect the reading of the device.

The rail parallelograms linkages 32,33 transmit the change of the angular position of the two feet 20, 21 with respect to one another onto the disk 10 with the vernier 11 and in this manner the relationship of the scale indicia 18a of the scale carrier 18 with respect to the scale indicia 11a on the vernier 11 is changed to the same value, whereby the position change can be read directly in degrees of angle.

By installing an electric transducer 24 — for example a potentiometer — with any conventional electrical source, such as a battery not shown and electric indication and registration of the result of measurement between the disk 10 and the scale carrier 18, reading errors can be largely avoided, the result of measurement can immediately be secured and new measurements or sequences of measurement can be carried out very quickly. This will save much time.

Figure 1:
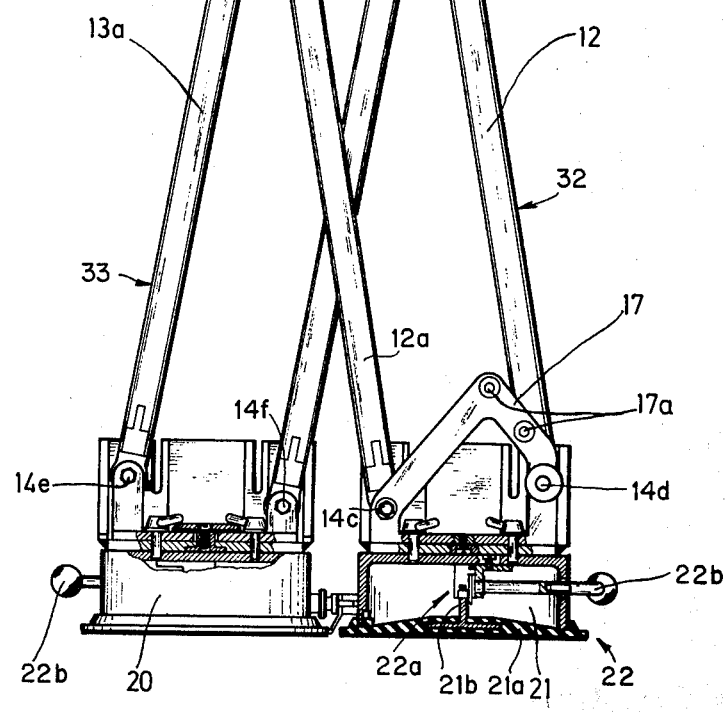
FIG. 1 is a front view of the described measuring device.

The vernier 11 is, as described above, constructed adjustably for the zero-point adjustment. Further, a bar 17 having holes 17a, as is illustrated in FIGS. 1 and 2, is associated with the parallelogram 32 for a unidirectional preadjusting — by which there is obtained a widening of the measuring range in the opposite direction. For this purpose the pivot bearing 14d is withdrawn, the hole 17a which is required for the desired position is moved to overlap with the bore of the bearing 14d and the bearing 14d is again inserted.

Starting from the zero plane, the measuring range of the device herein illustrated is ± 55°. For angular measurements in a quadrant above 55°, it is possible to preadjust the indicating means toward one side to the extent of some 20° to 40°. This makes possible measuring ranges of +75° to −35° or +95° to −15°.

For applying the feet at a desired angle of rotation, mountable arm or reference bar 23 are associated with the feet 20,21. The arm 23 performs the function of a straight edge. The arm 23 is secured to the feet 20,21 by any convenient means, such as a screw 23a. Since the feet 20,21 are round, the arm permits an accurate alignment of the measuring device to the axis of rotation between the surfaces 30 and 40. The device is advantageously constructed in such a manner that the feet 20, 21 with the holding devices 22 can be applied selectively at an angle of 90°.

The aforedescribed device can be used universally as a result of the invention and both static and dynamic measurements can be carried out very quickly without any special changes in the systems which are to be tested.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for the measurement of angles and angular variations between two surfaces, at least one of which is pivotal relative to the other, comprising:
   a disk having vernier indicia means thereon;
   a scale carrier having angle indicating indicia means thereon, said angle indicating indicia being positioned adjacent said vernier indicia means, means for rotatably securing said disk and said scale carrier together for rotatable movement with respect to each other and about a common axis of rotation;
   first and second foot members each having locking means for separately securing both of said foot members to different ones of two surfaces;
   first parallelogram linkage means comprising a pair of first rails and first pivot means pivotally securing said pair of first rails at one end to said scale carrier at locations spaced from said common axis of rotation and, at the other end, and at spaced locations to said first foot member; and
   second parallelogram linkage means comprising a pair of second rails and second pivot means pivotally securing said pair of second rails at one end to said scale carrier at locations spaced from said common axis of rotation and, at the other end, and at spaced locations to said second foot member, at least one of said first and said second pivot means being spherical pivot bearings for permitting an angle measurement regardless of translational position changes between said two surfaces in the orthogonally related z and x directions.

2. A device according to claim 1, wherein said second pivot means is said spherical pivot means.

3. A device according to claim 1, wherein said vernier indicia means includes adjusting means for facilitating a zero-point adjustment of said vernier indicia means relative to said angle indicating indicia and releasable locking means for securing said vernier indicia means to said disk.

4. A device according to claim 1, including a reference bar for preadjusting in a selected direction said first parallelogram linkage means relative to said first foot member.

5. A device according to claim 1, wherein said first and second foot members are adjustable selectively to an angle of 90° between said two surfaces.

* * * * *

UNITED STATES PATENT AND TRADEMARK OFFICE
CERTIFICATE OF CORRECTION

PATENT NO. : 3,952,417
DATED : April 27, 1976
INVENTOR(S) : Peter Bestehorn

It is certified that error appears in the above-identified patent and that said Letters Patent are hereby corrected as shown below:

Column 4, line 23; change "scale carrier" to ---disk---.

Signed and Sealed this

Nineteenth Day of October 1976

[SEAL]

Attest:

RUTH C. MASON
*Attesting Officer*

C. MARSHALL DANN
*Commissioner of Patents and Trademarks*